US010397174B2

(12) United States Patent
Harries et al.

(10) Patent No.: US 10,397,174 B2
(45) Date of Patent: Aug. 27, 2019

(54) MESSAGE DELIVERY IN A MESSAGE SYSTEM

(71) Applicant: INTERNATIONAL BUSINESS MACHINES CORPORATION, Armonk, NY (US)

(72) Inventors: Dominic P. Harries, Hursley (GB); Samuel D. Hughes, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 748 days.

(21) Appl. No.: 14/939,092

(22) Filed: Nov. 12, 2015

(65) Prior Publication Data

US 2017/0142041 A1 May 18, 2017

(51) Int. Cl.
*H04L 12/58* (2006.01)

(52) U.S. Cl.
CPC .................... *H04L 51/36* (2013.01)

(58) Field of Classification Search
CPC ................ H04L 67/16; H04L 51/06
See application file for complete search history.

(56) References Cited

U.S. PATENT DOCUMENTS

| 8,346,697 | B2 | 1/2013 | Lambov | |
|---|---|---|---|---|
| 9,002,899 | B2 | 4/2015 | Lambov | |
| 2004/0002967 | A1* | 1/2004 | Rosenblum | G06Q 30/0241 |
| 2006/0080428 | A1* | 4/2006 | Trossen | G06Q 10/109 709/224 |
| 2010/0114811 | A1* | 5/2010 | Lambov | G06N 5/02 706/48 |
| 2011/0258268 | A1* | 10/2011 | Banks | G06Q 10/06 709/206 |

\* cited by examiner

*Primary Examiner* — Lashonda T Jacobs
*Assistant Examiner* — Sm Z Islam
(74) *Attorney, Agent, or Firm* — Cantor Colburn LLP; Alexander Jochym

(57) ABSTRACT

Embodiments include a method of controlling message delivery from a publisher application to one or more subscriber applications of a messaging system, the one or more subscriber applications having a plurality of subscriptions registered with a broker application of the messaging system. The method includes generating a unified subscription description representing the plurality of registered subscriptions based on at least one stored intermediate subscription description, where each intermediate subscription description represents one or more registered subscriptions. The method also includes communicating the unified subscription description to the publisher application.

17 Claims, 5 Drawing Sheets

MESSAGE DELIVERY IN A MESSAGE SYSTEM

BACKGROUND

The present invention relates to the field of message delivery in a message system, and more specifically, to controlling message delivery from a publisher application to one or more subscriber applications.

Publish/subscribe is a messaging mechanism by which subscriber applications (hereinafter referred to as "subscribers") may receive information, in the form of messages, from publisher applications (hereinafter referred to as "publishers"). In this context, a message is a unit of data (such as one or more bits or a string of data). A typical publish/subscribe system has more than one publisher and more than one subscriber.

SUMMARY

According to an embodiment there is provided a computer-implemented method of controlling message delivery from a publisher application to one or more subscriber applications of a messaging system, the one or more subscriber applications having a plurality of subscriptions registered with a broker application of the messaging system. The method comprises generating a unified subscription description representing the plurality of registered subscriptions based on at least one stored intermediate subscription description, where each intermediate subscription description represents one or more registered subscriptions. The method also comprises communicating the unified subscription description to the publisher application.

According to another embodiment there is provided a processor for controlling message delivery from a publisher application to one or more subscriber applications of a messaging system, the one or more subscriber applications having a plurality of subscriptions registered with a broker application of the messaging system. The processor is adapted to generate a unified subscription description representing the plurality of registered subscriptions based on at least one stored intermediate subscription description, where each intermediate subscription description represents one or more registered subscriptions. The processor is also adapted to communicate the unified subscription description to the publisher application

BRIEF DESCRIPTION OF THE DRAWINGS

Embodiments of the present invention will now be described, by way of example only, with reference to the following drawings, in which.

DETAILED DESCRIPTION

Figure 1:
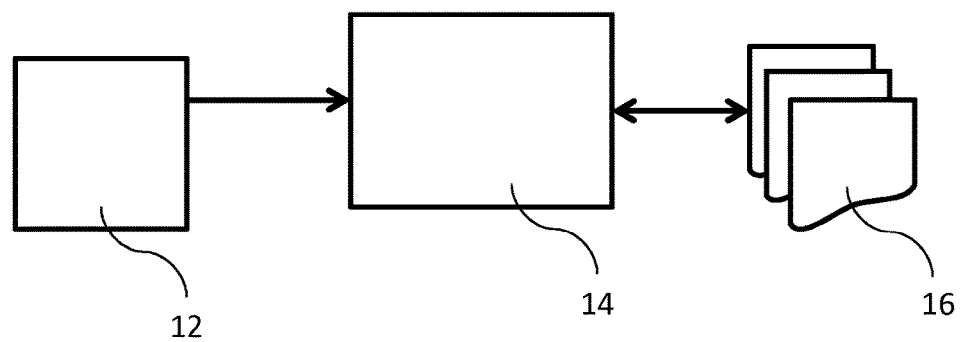
FIG. 1 is a block diagram of an example of an implementation of a messaging system according to an embodiment of the present subject matter.

It should be understood that the Figures are merely schematic and are not drawn to scale. It should also be understood that the same reference numerals are used throughout the Figures to indicate the same or similar parts.

Interactions between publishers and subscribers may be controlled by components of a general purpose messaging system, such as a queue manager or by a component known as a message broker. A messaging system is a service to which applications may connect, and a queue is an ordered list of messages maintained by the messaging system. Applications may place a message on a queue or request a message from a queue. The distinction between a queue manager and a message broker is not relevant to the present subject matter and these terms may be used interchangeably within the following description.

Publishers supply information about a subject, without needing to know anything about the applications that are interested in that information. Publishers generate this information in the form of messages, called publications, that they want to publish, and define the topic of these messages. The controlling component (queue manager or message broker) receives messages from publishers and subscriptions identifying subscribers on one or more topics. It then routes the published messages to the subscribers that have a registered interest in the topic(s).

Subscribers create subscriptions that describe the topic that the subscriber is interested in. Thus, the subscription determines which publications are forwarded to the subscriber. Subscribers may make multiple subscriptions and may receive information from many different publishers.

A drawback is that publication of a message may be a costly operation for the publisher and/or the broker. For example, if the publisher is a low-powered sensor which requires the use of a radio to publish a message, publication of a message will consume much-needed battery power. Also, if a message to be published is very large, a large amount of resources may be required to publish the message.

It is therefore desirable for a publisher to avoid unnecessary publication of messages, such as when there are no subscribers for the topic of the message for example. One possible approach to address this is for the publisher to transmit information about the message topic to the broker and ask whether there are any subscriptions matching the topic. However, this approach requires a request/response conversation between the publisher and broker. Also, if the publisher is publishing messages about many different topics, many conversations may be required.

Detailed is a concept for enabling a publisher to only publish a message relating to one or more topics when there are subscribers/consumers for the topic(s). The concept may be employed in a messaging system comprising a publisher, a broker and a plurality of subscribers. It is proposed to generate a consolidated description (otherwise referred to as a "unified subscription description") of the subscriptions and then transmit it to the publisher. The publisher can use the unified subscription description to determine if the topic of a message to be published matches any of the subscriptions. In this way, the publisher can determine if there is any need to publish the message and thereby avoid publishing messages for which there is no subscription.

Referring to FIG. 1, there is depicted a messaging system according to an embodiment of the present subject matter.

The messaging system 10 comprises a publisher 12, a message broker 14 and a plurality of subscribers 16. Interactions (such as communication of messages from the publisher 12 to the subscribers 16 are controlled by the message broker 14. The messaging system 10 is a service to which applications may connect and a queue is an ordered list of messages maintained by the messaging system 10. Applications may place a message on a queue or request a message from a queue. The distinction between a queue manager and a message broker is not relevant to the present subject matter and these terms may be used interchangeably within the following description.

The publisher 12 is adapted to supply information about a subject, without needing to know anything about the applications that are interested in that information. The publisher 12 generates the information in the form of messages, or publications, and defines the topic(s) of these messages. The message broker 14 is adapted to receive messages from the publisher 12, in addition to subscriptions from subscribers of one or more topics. The message broker 14 is adapted to route published messages to subscribers that have a registered interest in the topic(s) of the published messages.

To receive publications, a subscriber creates a subscription to selected publication topics. The message broker 14 is adapted to deliver publications to subscribers that have subscriptions which match the publication topic (and authorized to receive the publications).

A topic can be implemented as a text string describing an area of interest on which applications may wish to exchange messages (e.g., "device_attributes"). Subjects may be organized hierarchically, such as into a topic tree, using the forward slash ("/") character to create subtopics in the topic string (e.g., "device_attributes/temperature"). Topics are nodes in the topic tree that is the total space of all topics used within the messaging infrastructure. Topics may be leaf-nodes with no further subtopics, or intermediate nodes with subtopics. Topic strings that are created to represent subscriptions may contain wildcard schemes to pattern match against the topics of publications.

Subscribers 16 create subscriptions that describe the topic(s) that the subscriber is interested in. Thus, the subscription determines which publications are of interest to the subscriber. Subscribers may make multiple subscriptions and may receive information from many different publishers.

A subscription may be represented by a regular expression such as text string for example. Thus, more generally, a representation of a subscription may be represented using regular grammar. In the field of computer science, a regular grammar is a formal grammar that describes a regular language.

Subscriptions may be of two types: durable and non-durable. Non-durable subscriptions exist only as long as the subscribing application's connection to the message broker 14 remains active. The subscription is removed when the subscribing application disconnects from the message broker 14 deliberately or by loss of connection.

Durable subscriptions continue to exist when a subscribing application's connection to the message broker 14 is closed. If a subscription is durable, when the subscribing application disconnects, the subscription remains in place and may be used by the subscribing application when it reconnects.

Using the present subject matter, a unified subscription description of the subscriptions is generated by the message broker 14 and then transmitted to the publisher 12. The publisher can use the received unified subscription description to determine if the topic of a message to be published matches any of the subscriptions. If subscribers exist, the message is communicated to the message broker 14 for subsequent delivery to the appropriate subscribers. However, if it is determined from the unified subscription description that no subscriber is present for the message topic, the message is not communicated to the message broker 14. It may, instead be stored by the publisher 12 and later delivered to the message broker if and when a new unified subscription description is delivered to the publisher 12 which indicates the existence of a subscriber for the message topic.

Thus, the messaging system 10 includes a selective publication concept whereby the publisher 12 selects whether or not to publish a message based on a merged or consolidated description (a "unified subscription description") of the subscriptions provided to it by the message broker 14. In this example of the messaging system 10, in response to subsequent registration of a new subscriber 16 for a specified topic, a new unified subscription description is generated by the message broker 14 and 'pushed' (i.e. communicated without request) to the publisher 12.

In the messaging system 10, connection of a subscriber 16 to the system 10 causes the generation of a new unified subscription description, which is then communicated to the publisher 12. At the same or any time afterwards, a subscriber 16 that is already connected to the system 10 may register a new subscription for a topic in which it is interested with the message broker 14. Subscribers 16 may do this on a durable basis (once registered, the subscription remains until explicitly deleted) or a non-durable basis (when the application disconnects, the subscription is removed). A new unified subscription description may be generated and communicated to the publisher 12 every time there is a change in the subscriptions.

A regular expression (such as a text string) describing a topic may be converted into an automaton called a finite state machine (FSM). The fact that FSMs and regular expressions are equivalent is well understood from automata theory. The act of determining whether an input string matches a regular expression is exactly the same as determining whether the string is accepted by the corresponding FSM. Also, it is possible to take the union of any collection of FSMs, where the "union FSM" accepts any string accepted by any of the input FSMs. Taking the union of two FSMs is accomplished by creating a new FSM each of whose states is a tuple containing a state from the first FSM and a state from the second FSM. This procedure easily generalizes to arbitrary numbers of FSMs A method of generating the unified subscription description according to an embodiment may be readily understood with reference to FIG. 2. There is identified a schematic representation of the hierarchical associations between an exemplary unified subscription description 200 and the plurality of subscriptions 211, 212, 213, 221, 222, 223, 231 registered with the broker.

The unified subscription description 200 is generated on the basis of at least one intermediate subscription description 210, 220. Each intermediate subscription description represents at least one subscription. The unified subscription description 200 represents all subscriptions registered with the broker.

Figure 2:
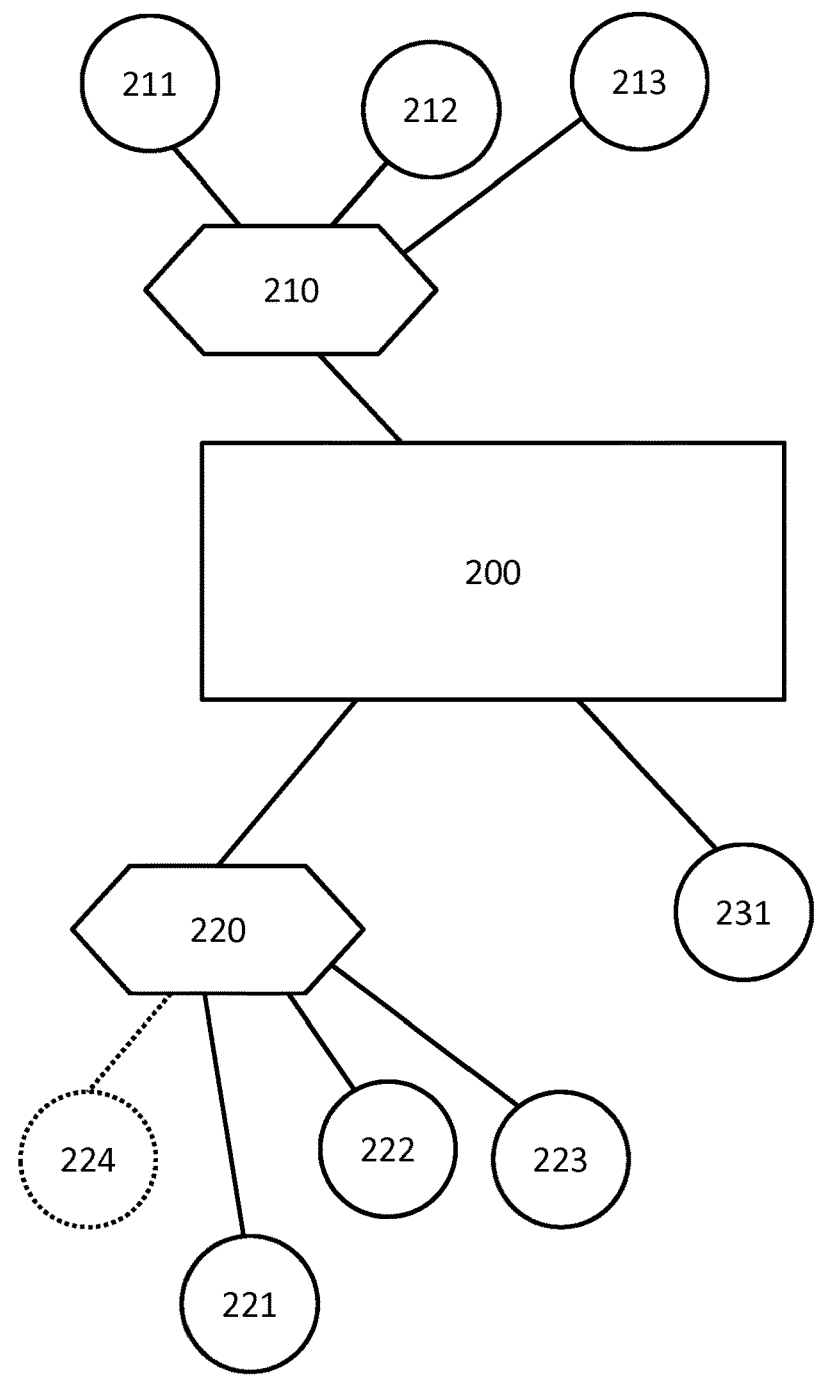
FIG. 2 is a conceptual schematic of the associations between a unified subscription description, intermediate subscription descriptions and subscriptions according to one embodiment.

It will be apparent that, with reference to FIG. 2, subscriptions are identified by circles, intermediate subscription descriptions by hexagons and the union subscription description by an oblong.

By way of example only, a unified subscription description is generated on the basis of a first intermediate description 210 and a second intermediate description 220. Each intermediate description may be retrieved from a storage system (e.g. a RAM, cloud storage or other memory device). The first intermediate subscription represents a first 211, second 212 and third 213 subscriptions registered with the broker. In other words, the first intermediate subscription provides information relating to a set of one or more subscriptions. Similarly, the second intermediate subscription represents at least a fourth 221, fifth 222 and sixth 223 subscriptions. By generating the unified subscription description based on the first and second intermediate descriptions, the unified subscription description represents the first 211 through sixth 223 subscriptions respectively.

The unified subscription description may, in embodiments, be generated on the further basis of additional subscriptions not associated with an intermediate description. For example, the unified subscription description 200 is generated on the basis of the first intermediate subscription 210, the second intermediate subscription 220 and a seventh subscription 231. In this way, the unified subscription description may represent all subscriptions registered with the broker.

In exemplary embodiments, each subscription is associated with an intermediate subscription description, such that a set of all intermediate subscription descriptions represents all subscriptions registered with the broker. In such embodiments, unified subscription description (by representing every intermediate subscription description) represents the subscriptions registered with the broker.

Intermediate subscription descriptions are stored by the broker for future use. This permits, in the event that a single subscription becomes unregistered or registered on the broker for example, for only a single intermediate subscription description to be adjusted, rather than each intermediate subscription description being updated.

This advantageously reduces the overhead or processing power required to generate the union subscription description. In the prior art, for example, it may have been necessary to recalculate the entire union subscription (based on all subscriptions) when a subscription is changed. Storage of the intermediate subscription descriptions reduces the amount of processing needed (as the descriptions have already been partially generated).

It is therefore clear that storage and reuse of intermediate subscription descriptions may reduce the number of operations that must be performed in order to generate or computer the union subscription description. This reduces the processing time and/or cost of generating the union subscription description.

When a subscription is added, deleted, registered, deregistered or otherwise altered with respect to the broker, a new intermediate subscription description may be generated (representing at least the identified subscription). The broker may determine whether a stored intermediate subscription description describes or represents at least one same subscription as the new intermediate subscription description. If a stored intermediate subscription description and the new intermediate subscription description both represent at least one same subscription, the stored intermediate subscription description is identifiable as an equivalent intermediate subscription description. In the event that the broker determines that an equivalent intermediate subscription description is stored, the new intermediate subscription description replaces the equivalent intermediate subscription description. In the event that the broker determines that no equivalent subscription description is stored, the new intermediate subscription description may be stored (i.e. in addition to the stored intermediate subscription description(s)). The union subscription description may be generated on the basis of the stored intermediate subscription descriptions.

In other words, in response to a subscription being changed, added or removed, the stored intermediate subscription description associated with the subscription is updated to reflect the change.

In embodiments, the equivalent (stored and/or old) intermediate subscription description is compared to the new (generated) intermediate subscription description. If the equivalent intermediate subscription is identical to the new intermediate subscription description, the stored intermediate subscription need not be replaced, nor the union subscription description recalculated.

Thus, in some scenarios, when the updated or adjusted intermediate subscription description (in response to a change in a subscription, such as a registration or deregistration) is identical to the equivalent stored intermediate subscription, the union subscription description is not regenerated.

Conceivably, the union subscription description is generated on the basis of the stored intermediate subscription descriptions and the new intermediate subscription description prior to determining whether an equivalent subscription description is stored.

By way of explanation, if an eighth subscription 224 becomes associated with the broker, a new second unified subscription description is generated. The new second unified subscription description is determined to correspond to the old (i.e. stored) second unified subscription description 220 as they both represent at least one same subscription (e.g. fourth description 221). Accordingly, the stored second unified subscription description is deleted and replaced by the new second unified subscription description. A new union subscription description 200 is generated on the basis of at least the new second unified subscription description (as well as the first intermediate subscription description).

Figure 3:
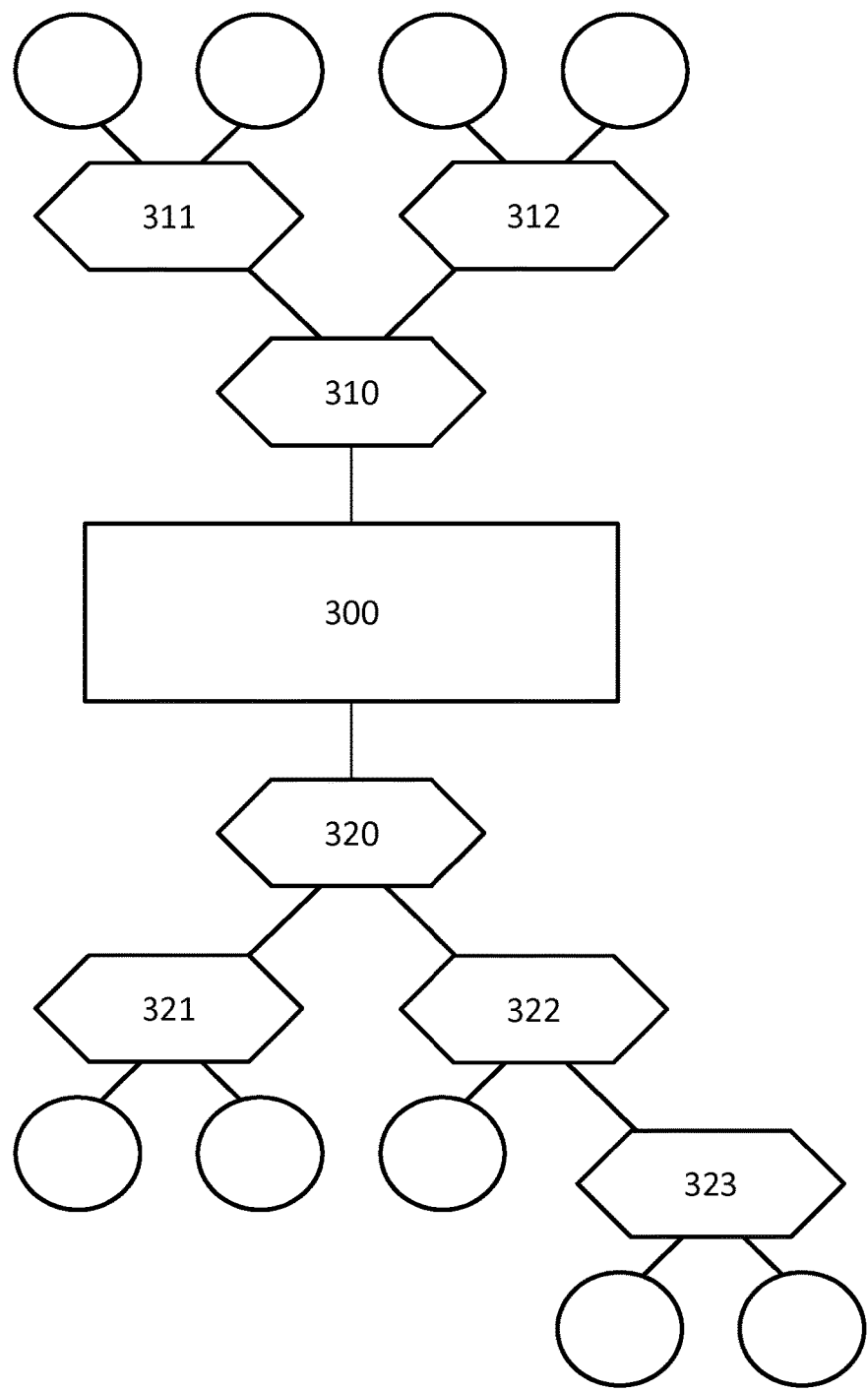
FIG. 3 is a conceptual schematic of the associations between a unified subscription description, intermediate subscription descriptions and subscriptions according to another embodiment.

Another embodiment may be described with reference to FIG. 3, which also illustrates hierarchical associations between an exemplary unified subscription description 300 (represented by an oblong), intermediate subscription descriptions 320, 321, 322, 310, 311, 312 (represented by hexagons) and subscriptions (represented by circles).

In optional embodiments, there may be introduced the concept of further intermediate subscription descriptions, each similarly representing at least one subscription. Intermediate subscription descriptions may be generated on the basis of at least one further intermediate subscription description. By way of example, with reference to FIG. 3, a first intermediate subscription description 310 may be generated on the basis of a first 311 and second 312 further intermediate subscription descriptions.

It is readily conceivable that such further intermediate subscription description may also represent additional intermediate subscription descriptions. In one example, second intermediate subscription description is generated on the basis of a third 321 and fourth 322 further intermediate subscription description. Fourth further intermediate subscription description 322 represents additional intermediate subscription description 323.

It is therefore apparent that an intermediate subscription description may be generated on the basis of more than one other intermediate subscription description, the later intermediate subscriptions descriptions also being generated on the basis of more than one other intermediate subscription description and so on.

In one embodiment, the union subscription description and each intermediate subscription description (including further and additional subscription descriptions) directly represents no more than two intermediate subscription descriptions and/or subscriptions. Directly represent should be understood to mean 'generated on the basis of' (e.g. intermediate subscription description 320 is associated with a total of five subscriptions, but is only generated on the basis of two further intermediate subscription descriptions 321 and 322)

In one such embodiment, for a broker having twelve registered subscriptions, no fewer than ten intermediate subscription descriptions in total are required.

It will be apparent from the above described embodiments that the hierarchical relationship in the generating of the union subscription description may be modeled as a tree data structure, where each subscription is represented by a leaf node (i.e. a node with no children) and each intermediate subscription description as a parent node (i.e. a node having at least one child). The root node of the tree data structure represents the union subscription description. It will be readily understood that if there are n subscriptions, the tree has a corresponding depth O(log n).

In embodiments, tree rotations are performed to minimize a depth of the tree data structure.

In embodiments, all intermediate subscription descriptions are stored (i.e. all parent nodes are stored). In other embodiments, only intermediate subscription descriptions on particular levels or depths of the tree data structure are stored. For example, it is conceivable that only those intermediate subscription descriptions that immediately descend from the union subscription description (i.e. intermediate subscription decision at a level or depth 1) are stored. In other examples, intermediate subscriptions descriptions at a level or depth of either 1 or 2 are stored.

In embodiments, each subscription associable with the broker (i.e. a potential subscription that may be registered on the broker) is always associated with the same intermediate subscription description. In other words, each intermediate subscription description is associated with a set of one or more potential descriptions, and represents descriptions in that set of potential descriptions that are registered with the broker.

In other embodiments, subscriptions are not associated with a single intermediate subscription description, and may be assigned to a particular intermediate subscription description upon registering to the broker. For example, a subscription may be assigned to a particular intermediate subscription description to minimize a depth of a tree data structure.

In an embodiment, each subscription is a text string which may be converted into a FSM. Intermediate subscription descriptions immediately associated with subscriptions (i.e. are direct parent nodes) may take the union of the converted FSMs. In other words, intermediate subscription descriptions may be a union of only a subset or portion of the FSMs representing subscriptions.

In exemplary embodiments, the unified subscription descriptions and each intermediate subscription description is a finite state machine. In such embodiments, the intermediate subscriptions descriptions are 'intermediate FSMs' and the unified subscription description is a 'union FSM', being the union of all intermediate FSMs. In one embodiment, the union FSM and each intermediate FSM is minimized (e.g. mathematically optimized). This advantageously reduces the processing power required to compute the union FSM.

One exemplary procedure followed by the broker 14 to initially generate a unified subscription description according to an embodiment (i.e. when there are no stored intermediate subscription descriptions) may be summarized as follows:

1. Take each subscription string in turn.
2. Convert each subscription string to an FSM.
3. Pair each FSM with another FSM.
4. Determine the union of each pair of FSMs to generate an intermediate FSM.
5. Store each intermediate FSM.
6. Pair each intermediate FSM with another intermediate FSM.
7. Determine the union of each pair of intermediate FSMs to generate further intermediate FSMs.
8. Repeat steps 5-7 until only a single pair of intermediate FSMs remain.
9. Compute the "union FSM" of this single pair of intermediate FSMs.
10. Minimize the union FSM (e.g. make it as small as possible).
11. Serialize the union FSM. For example, by simply writing out its attributes like as follows: fsm(alphabet={"a", "b"}, states={0,1}, initial=0, finals={1})
12. Transmit the union FSM to the publisher 12.

It will be understood that if there is an odd number of subscription strings, it may not be possible to pair every subscription string (i.e. one subscription string will remain unpaired). In such a scenario, step 7 may be adapted such that, in one iteration of steps 5-7, one further intermediate FSM is generated on the basis of one intermediate FSM and one FSM. See, for example, FIG. 3, where fourth further intermediate subscription description 322 represents additional intermediate subscription description 323 and a single subscription.

Similarly, it is conceivably possible that an odd number of intermediate FSMs are generated during steps 4 or 7. In such an instance, it may not be possible to pair each intermediate FSM, and the remaining (unpaired) intermediate FSM may be held over until the next iteration of steps 5-7 or until only two intermediate FSMs remain (i.e. if there are 3 intermediate FSMs remaining, one is held or temporarily stored until step 9).

In some embodiments, each intermediate FSM the initial set of intermediate FSMs (generated following step 4) may be the union of more than two FSMs (i.e. subscription strings). In other words, steps 3 and 4 may be adapted to comprise grouping FSMs into sets (of more than two FSMs), and, for each set, determining the union of FSMs in that set so as to generate an intermediate FSM. Each set of FSMs may, for example, be associated with similar subscription strings (e.g. all subtopics of a particular same topic). In other words, in some embodiments, at least one intermediate FSM represents subscriptions to a topic describing an area of interest.

Similarly steps 6-8 may be adapted such that intermediate FSMs are grouped into sets of more than two FSMs, where further intermediate FSMs are generated on the basis of intermediate FSMs in a set. The union FSM may be the union of more than two intermediate FSMs, for example, no fewer than three intermediate FSMs, for example, no fewer than five intermediate FSMs.

When a new message is to be published to a topic, the procedure followed by the publisher 12 may be summarized as follows:

1. Determine whether the FSM accepts the topic string.

2. If the FSM accepts the topic string, conclude that there is at least one subscriber who wants this message and therefore publish message.

3. If the FSM does not accept the topic string, conclude that there are no subscribers who want the message and therefore do not publish the message.

If a new subscription is registered at the message broker 14 (either for an existing or new subscriber), the message broker 14 may generate a new unified subscription description as follows:

1. Convert the new subscription to a new FSM.

2. Generate a new intermediate FSM by determining the union of at least the new FSM.

3. Determine whether the new intermediate FSM has an equivalent stored intermediate FSM.

4. If the new intermediate FSM has an equivalent stored intermediate FSM and optionally if the new intermediate FSM is not identical to the equivalent stored intermediate FSM, replace the stored intermediate FSM with the new intermediate FSM.

5. Compute a new 'union FSM' based on the stored intermediate FSMs.

This process may be quicker than computing an entirely new union FSM from all of the subscriptions.

Figure 4:
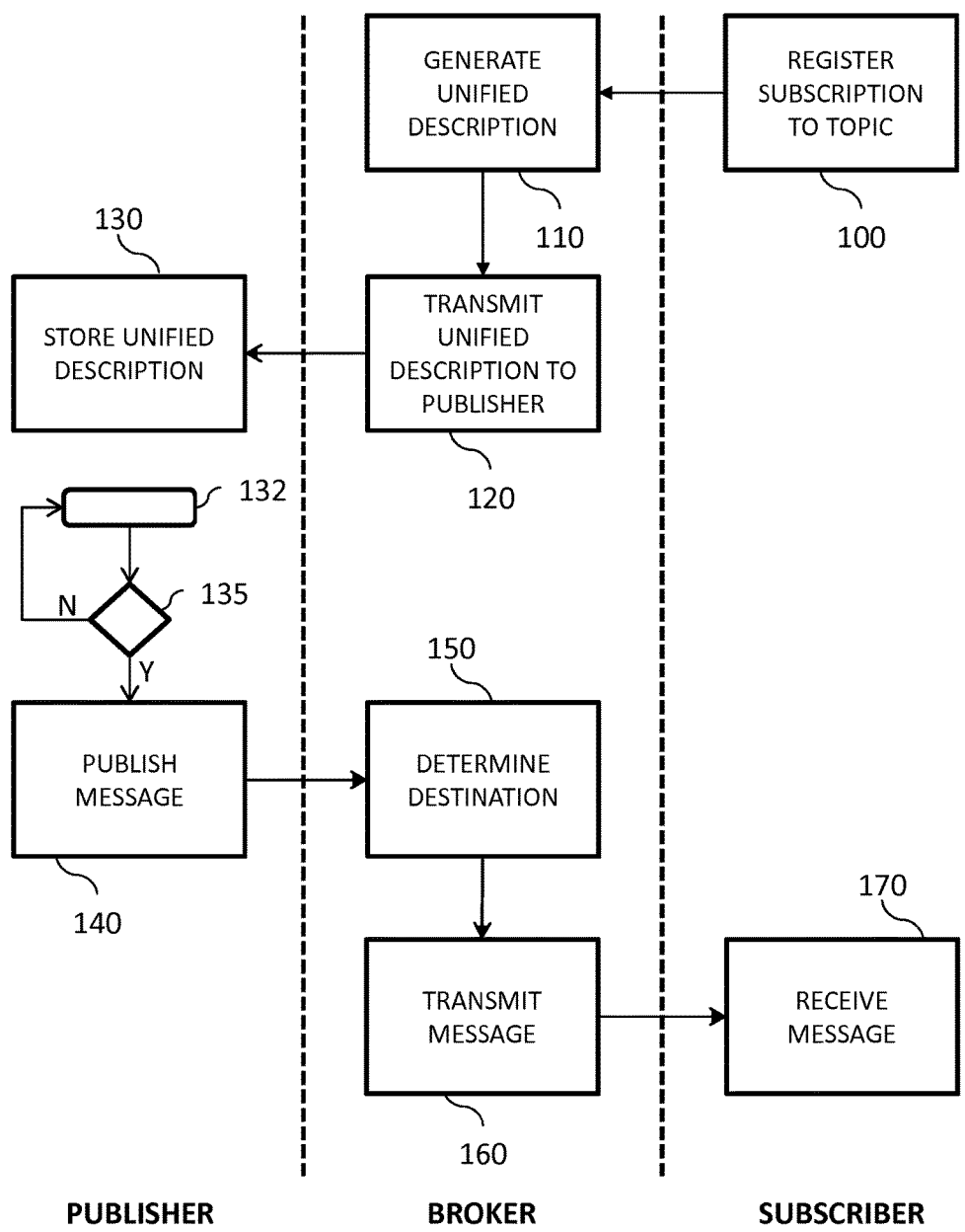
FIG. 4 is a flow chart of an example of an implementation of a method according to an embodiment of the present subject matter.

FIG. 4 is a flow chart of an example of an implementation of method according to an embodiment of the present subject matter. FIG. 4 shows the steps of the method carried out by a messaging system, such as the system in FIG. 1, according to one example of the present subject matter. Here, it is noted that a subscriber registration list maintained by the message broker is initially empty.

First, in step 100, one or more subscribers create subscriptions which describe the topic(s) that the one or more subscribers are interested in, and then register the subscriptions with the broker. The subscriptions determine which publications are of interest to the subscriber(s) and are represented as regular expressions (such as text strings for example).

Next, in step 110, the broker generates a unified subscription description of the registered subscriptions. Here, each regular expression (e.g. text string) describing a topic of interest is converted into a FSM, and then the union FSM of all of the FSMs is computed.

The union FSM is then transmitted to the publisher in step 120, and the publisher subsequently receives and stores the union FSM in step 130.

When a new message is to be published to a topic by the publisher (in step 132), the method proceeds to step 135, where the publisher determines whether the topic(s) of the message to be published matches any of the subscriptions using the stored unified subscription description. Here, this comprises determining whether the stored union FSM accepts the topic string of the message to be published. If it is determined that the FSM does not accept the topic string, it is concluded that there are no subscribers who want the message and the method returns back to step 132 to wait for a new message to be published. Conversely, if, in step 135, it is determined that the FSM accepts the topic string, it is concluded that there is at least one subscriber who wants this message and method proceeds to step 140 where the message is communicated to the broker for subsequent delivery to the appropriate subscribers.

The broker receives the message communicated from the publisher and then determines, in step 150, the destination(s) of the message based on the registered subscriptions for the topic of the message. The broker then transmits the message to the destination(s) of the appropriate subscriber(s) in step 160 and the message is received by the subscriber(s) in step 170.

Figure 5:
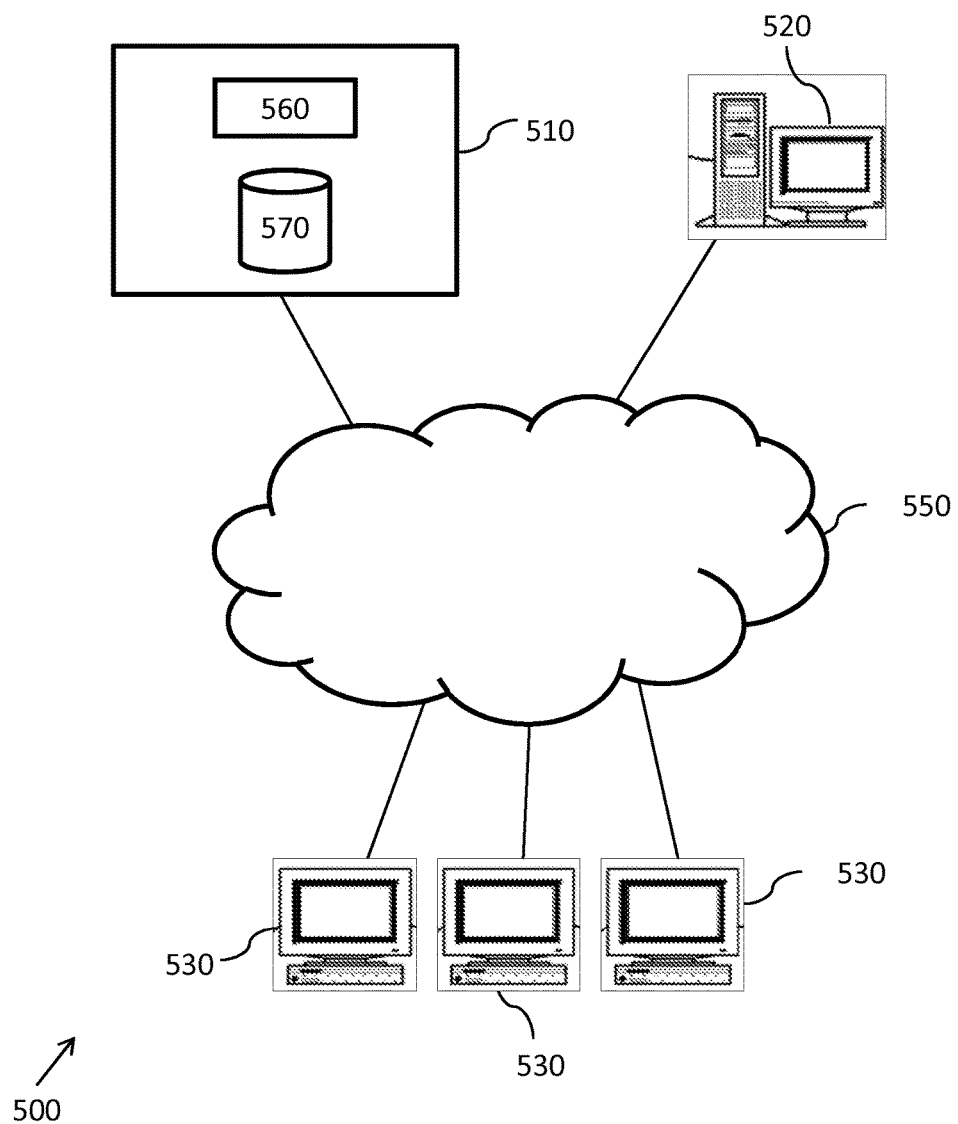
FIG. 5 is a schematic block diagram of a system according to an embodiment of the present subject matter.

FIG. 5 is a schematic block diagram of a messaging system 500 according to an embodiment of the present subject matter. The messaging system 500 comprises a publisher 510 a message broker server 520, and a plurality of subscriber terminals 530. The publisher 510, message broker server 520, and subscriber terminals 530 are all connected to a communication network 550 (such as the Internet for example).

The subscribers create subscriptions to selected publication topics and register the subscriptions with the message broker server 520.

The message broker server 520 is adapted to generate a unified subscription description of the registered subscriptions based on one or more stored intermediate subscription description. Each intermediate subscription description represents one or more registered subscriptions. Such a generated unified subscription description represents the registered subscriptions in a consolidated format which may, for example, be of a reduced data size and represented and/or communicated more efficiently than the information about the registered subscriptions as provided to the message broker server 520.

The message broker server 520 is adapted to transmit the unified subscription description to the publisher 510 via the communication network 550.

The publisher 510 comprises a processing unit 560 and a data storage unit 70. The data storage unit 570 is adapted to store a unified subscription description received from the message broker server 520 (via the communication network 550). The data storage unit 570 may also be adapted to store the at least one intermediate subscription descriptions, from which the unified subscription description is generated. The processing unit 560 is adapted to analyze a unified subscription description stored in the data storage unit 70 so as to determine if the topic of a message to be published matches any of the subscriptions represented by the unified subscription description.

Thus, the publisher 510 is adapted to use the received unified subscription description to determine if the topic of a message to be published matches any of the registered subscriptions. If there are registered subscriptions for the message topic, the message is transmitted (via the communication network 550) to the message broker server 520 for subsequent delivery to the appropriate subscriber terminals 530.

However, if it is determined from the unified subscription description that there are no registered subscriptions for the message topic, the message is not transmitted by the publisher 510. The message may, instead, be stored in the data storage unit 570 of the publisher 510 and later transmitted to the message broker server 520 if and when a new unified subscription description is delivered to the publisher 510 which indicates the existence of a subscriber for the message topic. Alternatively, the message may be discarded (immediately or after a predetermined amount of time). In order to avoid locking up of applications and to trigger generation of an appropriate feedback message, the present subject matter may be implemented such that if no new subscription for the message topic is registered within a predetermined time, the message may be discarded (e.g. deleted from the data storage unit 570).

It will be appreciated that the messaging system 500 enables a selective publication concept by generating a unified description of topic subscriptions and providing the unified description to a publisher 510. Using the unified description of topic subscriptions, the publisher 510 is able to determine whether or not a message should be published. This may help to avoid unnecessary communication between the message broker server 520 and the publisher 510. It may also avoid unnecessary message transmissions from the publisher 510. As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

It will be equally clear to one of skill in the art that all or part of a logic arrangement according to one embodiment of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of controlling message delivery from a publisher application to one or more subscriber applications of a messaging system, the one or more subscriber applications having a plurality of subscriptions registered with a broker application of the messaging system, the method comprising:
    generating a unified subscription description representing the plurality of registered subscriptions based on at least one stored intermediate subscription description, wherein each intermediate subscription description represents one or more registered subscriptions;
    determining that a particular subscription of the plurality of subscriptions has been registered, unregistered, or altered;
    generating a new intermediate subscription description, the new intermediate subscription description representing at least the particular subscription;
    determining that a stored intermediate subscription description represents at least one same subscription as the new intermediate subscription description,
    replace the stored intermediate subscription description with the new intermediate subscription description without altering any other stored intermediate subscription description;
    generating an updated unified subscription description based at least in part on the new intermediate subscription description; and
    communicating the updated unified subscription description to the publisher application.

2. The computer implemented method of claim 1, further comprising:
    generating the one or more intermediate subscription descriptions, each representing one or more subscriptions registered with the broker application; and
    storing the one or more intermediate subscription descriptions.

3. The computer-implemented method of claim 1, wherein each subscription is represented by a finite state machine, FSM, and each intermediate subscription description is represented by an intermediate FSM, the intermediate FSM being the union of the one or more FSMs representing the one or more registered subscriptions associated with the respective intermediate subscription description, and wherein the generating a unified subscription description comprises:
    generating a union FSM, the union FSM comprising the union of the at least one intermediate FSM.

4. The computer-implemented method of claim 3, wherein the step of generating a unified subscription description further comprises at least one of: minimizing the union FSM; and serializing the union FSM.

5. The computer-implemented method of claim 3, further comprising the step of:
    generating one or more intermediate FSMs, each intermediate FSM being the union of one or more FSMs representing a respective one or more registered subscription; and
    storing the one or more intermediate FSMs.

6. The computer-implemented method of claim 5, wherein, for each intermediate FSM, the one or more subscriptions associated with that intermediate FSM is represented by a text string, and wherein the step of computing the one or more intermediate FSMs is preceded by the step of:
    converting each text string into a respective FSM so as to obtain the one or more FSMs representing the one or more registered subscriptions.

7. The computer-implemented method of claim 1, wherein the one or more intermediate subscription descriptions represent every subscription registered with the broker application, such that the unified subscription description represents the stored one or more intermediate subscription descriptions.

8. A processor for controlling message delivery from a publisher application to one or more subscriber applications of a messaging system, the one or more subscriber applications having a plurality of subscriptions registered with a broker application of the messaging system, the processor being adapted to:

generate a unified subscription description representing the plurality of registered subscriptions based on at least one stored intermediate subscription description, wherein each intermediate subscription description represents one or more registered subscriptions;

determine that a particular subscription of the plurality of subscriptions has been registered, unregistered, or altered;

generate a new intermediate subscription description, the new intermediate subscription description representing at least the particular subscription;

determine that a stored intermediate subscription represents at least one same subscription as the new intermediate subscription description;

replace the stored intermediate subscription with the new intermediate subscription description without altering any other stored intermediate subscription description;

generate an updated unified subscription description based at least in part on the new intermediate subscription description; and communicate the updated unified subscription description to the publisher application.

9. The processor of claim 8, further adapted to:

generate the one or more intermediate subscription descriptions, each representing one or more subscriptions registered with the broker application; and store the one or more intermediate subscription descriptions.

10. The processor of claim 8, wherein each subscription is represented by a finite state machine, FSM, and each intermediate subscription description is represented by an intermediate FSM, the intermediate FSM being the union of the one or more FSMs representing the one or more registered subscriptions associated with the respective intermediate subscription description, and wherein the processor is further adapted to:

during the step of generating the unified subscription description, generate a union FSM, the union FSM comprising the union of the at least one intermediate FSM.

11. The processor of claim 10, wherein the processor is further adapted to:

during the step of generating a unified subscription description, perform at least one of the following: minimizing the union FSM; and serializing the union FSM.

12. The processor of claim 10, further adapted to:

generate one or more intermediate FSMs, each intermediate FSM being the union of one or more FSMs representing a respective one or more registered subscription; and store the one or more intermediate FSMs.

13. The processor of claim 12 wherein, for each intermediate FSM, the one or more subscriptions associated with that intermediate FSM is represented by a text string, and wherein the processor is adapted to, prior to generating the one or more intermediate FSMs:

convert each text string into a respective FSM so as to obtain the one or more FSMs representing the one or more registered subscriptions.

14. The processor of claim 8, wherein the one or more intermediate subscription descriptions represent every subscription registered with the broker application, such that the unified subscription description represents the stored one or more intermediate subscription descriptions.

15. The processor of claim 8, wherein the processor is a message broker server of a messaging system.

16. A computer program product for monitoring communication patterns and performing behavioral modification, the one or more subscriber applications having a plurality of subscriptions registered with a broker application of the messaging system, the computer program product comprising:

a non-transitory storage medium readable by a processing circuit and storing instructions for execution by the processing circuit for performing a method comprising:

generating a unified subscription description representing the plurality of registered subscriptions based on at least one stored intermediate subscription description, wherein each intermediate subscription description represents one or more registered subscriptions;

determining that a particular subscription of the plurality of subscriptions has been registered, unregistered, or altered;

generating a new intermediate subscription description, the new intermediate subscription description representing at least the particular subscription;

determining that a stored intermediate subscription description represents at least one same subscription as the new intermediate subscription description;

replacing the stored intermediate subscription description with the new intermediate subscription description without altering any other stored intermediate subscription description;

generating an updated unified subscription description based at least in part on the new intermediate subscription description; and communicating the updated unified subscription description to the publisher application.

17. The computer program product of claim 16, wherein the method further comprises:

generating the one or more intermediate subscription descriptions, each representing one or more subscriptions registered with the broker application; and storing the one or more intermediate subscription descriptions.

* * * * *